(12) United States Patent
Yu

(10) Patent No.: US 12,480,902 B2
(45) Date of Patent: Nov. 25, 2025

(54) DRIFT-FREE HUMIDITY SENSOR AND CALIBRATION METHOD THEREOF

(71) Applicant: SENSYLINK MICROELECTRONICS INC., Shanghai (CN)

(72) Inventor: Guangjun Yu, Shanghai (CN)

(73) Assignee: SENSYLINK MICROELECTRONICS INC., Shanghai (CN)

( * ) Notice: Subject to any disclaimer, the term of this patent is extended or adjusted under 35 U.S.C. 154(b) by 0 days.

(21) Appl. No.: 18/284,556

(22) PCT Filed: Oct. 24, 2022

(86) PCT No.: PCT/CN2022/126889
§ 371 (c)(1),
(2) Date: Sep. 28, 2023

(87) PCT Pub. No.: WO2023/165144
PCT Pub. Date: Sep. 7, 2023

(65) Prior Publication Data
US 2024/0175833 A1    May 30, 2024

(30) Foreign Application Priority Data

Mar. 1, 2022 (CN) .......................... 202210196787.8
Mar. 1, 2022 (CN) .......................... 202210197835.5

(51) Int. Cl.
*G01N 27/04* (2006.01)
*G01N 27/22* (2006.01)

(52) U.S. Cl.
CPC ......... *G01N 27/048* (2013.01); *G01N 27/045* (2013.01); *G01N 27/223* (2013.01); *G01N 27/226* (2013.01); *G01N 27/228* (2013.01)

(58) Field of Classification Search
CPC .. G01N 27/048; G01N 27/045; G01N 27/223; G01N 27/226; G01N 27/228; G01N 27/225; G01N 27/04; G01N 27/22
See application file for complete search history.

(56) References Cited

U.S. PATENT DOCUMENTS 4,793,175 A    12/1988    Fedter et al.
9,696,272 B2    7/2017    Ledwosinska et al.
(Continued)

FOREIGN PATENT DOCUMENTS

CN    1782700 A    6/2006
CN    105807340 A    7/2016
(Continued)

*Primary Examiner* — Alvaro E Fortich
(74) *Attorney, Agent, or Firm* — Bayramoglu Law Offices LLC

(57) ABSTRACT

A drift-free humidity sensor and a calibration method thereof are provided. The drift-free humidity sensor includes a first humidity sensor unit and a second humidity sensor unit. The first humidity sensor unit includes a first measuring electrode, and a first humidity sensitive material is covered onto the first measuring electrode. The second humidity sensor unit includes a second measuring electrode, and a second humidity sensitive material is covered onto the second measuring electrode. The first humidity sensor unit and the second humidity sensor unit have different maximum humidity drifts. The drift-free humidity sensor effectively solves the drift problem of ordinary capacitive or resistive humidity sensors.

20 Claims, 5 Drawing Sheets

(56) References Cited

U.S. PATENT DOCUMENTS

| | | | | |
|---|---|---|---|---|
| 2010/0147070 A1* | 6/2010 | Jun | ............... | G01N 27/121 |
| | | | | 216/13 |
| 2014/0197851 A1* | 7/2014 | Astley | ............... | G01R 27/02 |
| | | | | 324/660 |
| 2015/0285755 A1* | 10/2015 | Moss | ............... | G01N 27/121 |
| | | | | 702/133 |
| 2016/0025665 A1* | 1/2016 | Hebert | ............... | G01N 27/223 |
| | | | | 216/13 |
| 2017/0038325 A1* | 2/2017 | Takashima | ............... | G06K 19/0702 |
| 2019/0195820 A1 | 6/2019 | Fornasari et al. | | |

FOREIGN PATENT DOCUMENTS

| | | |
|---|---|---|
| CN | 109405884 A | 3/2019 |
| CN | 111189890 A | 5/2020 |
| CN | 112114009 A | 12/2020 |
| CN | 112229878 A | 1/2021 |
| CN | 114705724 A | 7/2022 |
| CN | 114705725 A | 7/2022 |
| JP | 2016017889 A | 2/2016 |

* cited by examiner

DRIFT-FREE HUMIDITY SENSOR AND CALIBRATION METHOD THEREOF

CROSS REFERENCE TO THE RELATED APPLICATIONS

This application is the national phase entry of International Application No. PCT/CN2022/126889, filed on Oct. 24, 2022, which is based upon and claims priority to Chinese Patent Applications No. 202210197835.5, filed on Mar. 1, 2022; and No. 202210196787.8, filed on Mar. 1, 2022; the entire contents of which are incorporated herein by reference.

TECHNICAL FIELD

The present disclosure relates to the technical field of humidity sensors, and in particular to a drift-free humidity sensor and a calibration method thereof.

BACKGROUND

Humidity sensors are widely used in many fields such as indoor temperature and humidity monitoring, smart home, white household appliances, security, and agriculture, playing a huge role. The implementation types of humidity sensors include resistive type, capacitive type, mass weighing type, dry/wet bulb type, etc. The capacitive and resistive types have advantages such as easy compatibility with complementary metal-oxide-semiconductor transistor (CMOS) processes, good linearity, and wide humidity range (0-100% RH). Therefore, temperature and humidity sensor chips mostly use capacitive and resistive types, with the capacitive type being the most widely used.

However, due to the inherent characteristics of polymers, capacitive, resistive or pressure-sensitive type sensors using polymers as humidity sensitive materials will inevitably generate chemically adsorbed water vapor that is hard to be desorbed, resulting in humidity drift. Especially in high-temperature and high-humidity environments, the long-chain spatial expansion of polymers will lead to more apparent humidity drift characteristics.

In order to solve the drift problem of humidity sensors, US patent application U.S. Pat. No. 9,696,272B2 proposes a method of adjusting the sampling frequency to improve the drift characteristic. US patent application U.S. Pat. No. 4,793,175 proposes a solution of using an inorganic substance as a humidity sensitive material to resist drift. In addition, a large number of literatures propose improved polymer structures to address the drift problem.

SUMMARY

In view of the defects in the prior art, an objective of the present disclosure is to provide a drift-free humidity sensor and a calibration method thereof.

The drift-free humidity sensor provided by the present disclosure includes a first humidity sensor unit, a second humidity sensor unit, and an analysis and processing unit, wherein the analysis and processing unit is a processor or is part of a processor; and the first humidity sensor unit includes a first measuring electrode and a first humidity sensitive material covering the first measuring electrode; the second humidity sensor unit includes a second measuring electrode and a second humidity sensitive material covering the second measuring electrode; the first humidity sensor unit and the second humidity sensor unit have different maximum humidity drifts; and the analysis and processing unit is configured to calibrate and output measurement values of the first humidity sensor unit and the second humidity sensor unit.

Further, the first measuring electrode includes a first measuring positive electrode and a first measuring negative electrode; and the first measuring positive electrode and the first measuring negative electrode are provided with interdigital electrodes;
the second measuring electrode includes a second measuring positive electrode and a second measuring negative electrode; and the second measuring positive electrode and the second measuring negative electrode are provided with the interdigital electrodes; and
the interdigital electrodes are arranged in a staggered manner.

Further, the first measuring electrode and the second measuring electrode are capacitive electrodes; and alternatively, the first measuring electrode and the second measuring electrode are resistive electrodes.

Further, when the first measuring electrode and the second measuring electrode are the capacitive electrodes, a passivation layer is provided between one side of the first measuring electrode and the first humidity sensitive material; a dielectric layer and a silicon wafer substrate are sequentially arranged on the other side of the first measuring electrode; and the dielectric layer is filled between the first measuring electrode and the silicon wafer substrate; and
a passivation layer is provided between one side of the second measuring electrode and the second humidity sensitive material; a dielectric layer and a silicon wafer substrate are sequentially arranged on the other side of the second measuring electrode; and the dielectric layer is filled between the second measuring electrode and the silicon wafer substrate.

Further, when the first measuring electrode and the second measuring electrode are the resistive electrodes, the first humidity sensitive material is arranged on one side of the first measuring electrode; a dielectric layer and a silicon wafer substrate are sequentially arranged on the other side of the first measuring electrode; and the dielectric layer is filled between the first measuring electrode and the silicon wafer substrate; and
the second humidity sensitive material is arranged on one side of the second measuring electrode; a dielectric layer and a silicon wafer substrate are sequentially arranged on the other side of the second measuring electrode; and the dielectric layer is filled between the second measuring electrode and the silicon wafer substrate.

Further, for the capacitive electrodes, the first humidity sensitive material and the second humidity sensitive material are photosensitive humidity sensitive materials or non-photosensitive humidity sensitive materials; and a processing method of the first humidity sensitive material and the second humidity sensitive material includes:
if the first humidity sensitive material and the second humidity sensitive material are both the photosensitive humidity sensitive materials, performing patterning through direct photolithography;
if one of the first humidity sensitive material or the second humidity sensitive material is the non-photosensitive humidity sensitive material, the processing method includes:
S1.1: spin-coating and curing the non-photosensitive humidity sensitive material on the passivation layer of the first measuring electrode and the passivation layer of the second measuring electrode; spin-coating a photoresist on the non-photosensitive humidity sensitive material, and performing desired patterning through photolithography; performing dry etching; and removing the photoresist to complete the processing of one humidity sensitive material; and S1.2: spin-coating the photosensitive humidity sensitive material; performing patterning through photolithography; and curing the photosensitive humidity sensitive material to form the other humidity sensitive material; and if the first humidity sensitive material and the second humidity sensitive material are both the non-photosensitive humidity sensitive materials, the processing method includes:

S2.1: spin-coating and curing the first humidity sensitive material on the passivation layer of the first measuring electrode and the passivation layer of the second measuring electrode, where a thickness of the first humidity sensitive material is more than twice a sum of a width and edge spacing of the interdigital electrode; spin-coating a photoresist on the first humidity sensitive material, and performing desired patterning through photolithography; performing dry etching; and removing the photoresist to complete the processing of the first humidity sensitive material; and S2.2: spin-coating and curing the second humidity sensitive material; spin-coating a photoresist on the second humidity sensitive material, and performing desired patterning through photolithography; performing dry etching; retaining the second humidity sensitive material attached to the first humidity sensitive material; and removing the photoresist to complete the processing of the second humidity sensitive material.

Further, for the resistive electrodes, the first humidity sensitive material and the second humidity sensitive material are both photosensitive humidity sensitive materials; alternatively, one of the first humidity sensitive material and the second humidity sensitive material is a non-photosensitive humidity sensitive material, and the other one of the first humidity sensitive material and the second humidity sensitive material is a photosensitive humidity sensitive material; and a processing method of the first humidity sensitive material and the second humidity sensitive material includes:

if the first humidity sensitive material and the second humidity sensitive material are both the photosensitive humidity sensitive materials, performing patterning through direct photolithography;

if one of the first humidity sensitive material or the second humidity sensitive material is the non-photosensitive humidity sensitive material, the processing method includes:

S3.1: spin-coating and curing the non-photosensitive humidity sensitive material on the first measuring electrode and the second measuring electrode; spin-coating a photoresist on the non-photosensitive humidity sensitive material, and performing desired patterning through photolithography; performing dry etching; and removing the photoresist to complete the processing of one humidity sensitive material; and S3.2: spin-coating the photosensitive humidity sensitive material; performing patterning through photolithography; and curing the photosensitive humidity sensitive material to form the other humidity sensitive material; and if the first humidity sensitive material and the second humidity sensitive material are both the non-photosensitive humidity sensitive materials, the processing method includes:

S4.1: spin-coating and curing a first non-photosensitive humidity sensitive material on the first measuring electrode and the second measuring electrode; spin-coating a photoresist on the first non-photosensitive humidity sensitive material, and performing desired patterning through photolithography; performing dry etching; and removing the photoresist to complete the processing of one humidity sensitive material; and S4.2: spin-coating a second non-photosensitive humidity sensitive material; spin-coating a photoresist, and performing patterning through photolithography; performing development on the photoresist through an alkaline developer (tetramethylammonium hydroxide (TMAH)), and corroding the second non-photosensitive humidity sensitive material; removing the photoresist; and curing the second non-photosensitive humidity sensitive material to form the other humidity sensitive material.

Further, the drift-free humidity sensor is provided with a differential sampling structure; and the first humidity sensor unit includes a first sensor subunit and a second sensor subunit, while the second humidity sensor unit includes a third sensor subunit and a fourth sensor subunit.

One or more embodiments of the present disclosure provide a calibration method of the humidity sensor, including:

S1: acquiring a relationship between a maximum humidity drift characteristic of the first humidity sensor unit and an environmental humidity and a relationship between a maximum humidity drift characteristic of the second humidity sensor unit and the environmental humidity, and calculating a maximum drift difference between the first humidity sensor unit and the second humidity sensor unit;

S2: performing regression fitting on humidity sensitive capacitance or resistance values of the first humidity sensor unit and the second humidity sensor unit with measured relative humidity (RH) values to acquire a first fitted equation and a second fitted equation;

S3: acquiring RH values of the first humidity sensor unit and the second humidity sensor unit in a certain humidity environment, calculating an actual RH difference between the first humidity sensor unit and the second humidity sensor unit, and comparing the actual RH difference with the maximum drift difference;

S4: comparing the actual RH difference between the first humidity sensor unit and the second humidity sensor unit with the relationship between the maximum drift characteristic of the first humidity sensor unit and the environmental humidity and the relationship between the maximum drift characteristic of the second humidity sensor unit and the environmental humidity to acquire a humidity drift amount of the first humidity sensor unit and a humidity drift amount of the second humidity sensor unit in a current humidity environment;

S5: based on the first fitted equation and the second fitted equation, as well as the humidity drift amount of the first humidity sensor unit and the humidity drift amount of the second humidity sensor unit acquired in step S4, establishing real RH-dependent equations, respectively;

S6: establishing, based on the real RH-dependent equations in step S5, an RH-dependent second-order equation of the first humidity sensor unit and an RH-dependent second-order equation of the second humidity sensor unit; and S7: weighting based on a difference between an RH value calculated according to the RH-dependent second-order equation of the first humidity sensor unit and an RH value calculated according to the RH-dependent second-order equation of the second humidity sensor unit to complete a calibration process.

Further, a maximum drift of the first humidity sensor unit and a maximum drift of the second humidity sensor unit are acquired through an 85° C./85% RH test or a 120° C./100% RH highly accelerated stress test (HAST).

Further, step S7 further includes: performing weights allocation according to a ratio of 1:1 if the difference between the RH value calculated according to the RH-dependent second-order equation of the first humidity sensor unit and the RH value calculated according to the RH-dependent second-order equation of the second humidity sensor unit is less than a set value; and taking, if the difference is greater than the set value, a sensor unit with higher confidence as a main sensor unit, and allocating a higher weight to the main sensor unit.

BRIEF DESCRIPTION OF THE DRAWINGS

Other features, objectives, and advantages of the present disclosure will become more apparent by reading the detailed description of non-limiting embodiments with reference to the following drawings.

REFERENCE NUMERALS

| | |
|---|---|
| 101. first measuring electrode | 102. second measuring electrode |
| 1011. first measuring positive electrode | 1021. second measuring positive electrode |
| 1012. first measuring negative electrode | 1022. second measuring negative electrode |
| 201. first humidity sensitive material | 202. second humidity sensitive material |
| 211. passivation layer | 213. dielectric layer |
| 212. interdigital electrode | 214. silicon wafer substrate |
| 111. first sensor subunit | 112. second sensor subunit |
| 113. third sensor subunit | 114. fourth sensor subunit |
| 1111. first subunit positive electrode | 1112. first subunit negative electrode |
| 1121. second subunit positive electrode | 1122. second subunit negative electrode |
| 1131. third subunit positive electrode | 1132. third subunit negative electrode |
| 1141. fourth subunit positive electrode | 1142. fourth subunit negative electrode |

DETAILED DESCRIPTION OF THE EMBODIMENTS

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

A planar humidity sensor includes a capacitive humidity sensor and a resistive humidity sensor. Generally, an interdigital structure is provided on a silicon wafer or an application specific integrated circuit (ASIC) chip, and a layer of humidity sensitive material is coated on an interdigital electrode to achieve the detection of a humidity sensitive capacitor. A backend circuit detection structure is generally divided into a single-ended structure and a differential structure. The single-ended structure is configured to sample a single electrode, while the differential structure is configured to sample two symmetrical electrodes.

Figure 1:
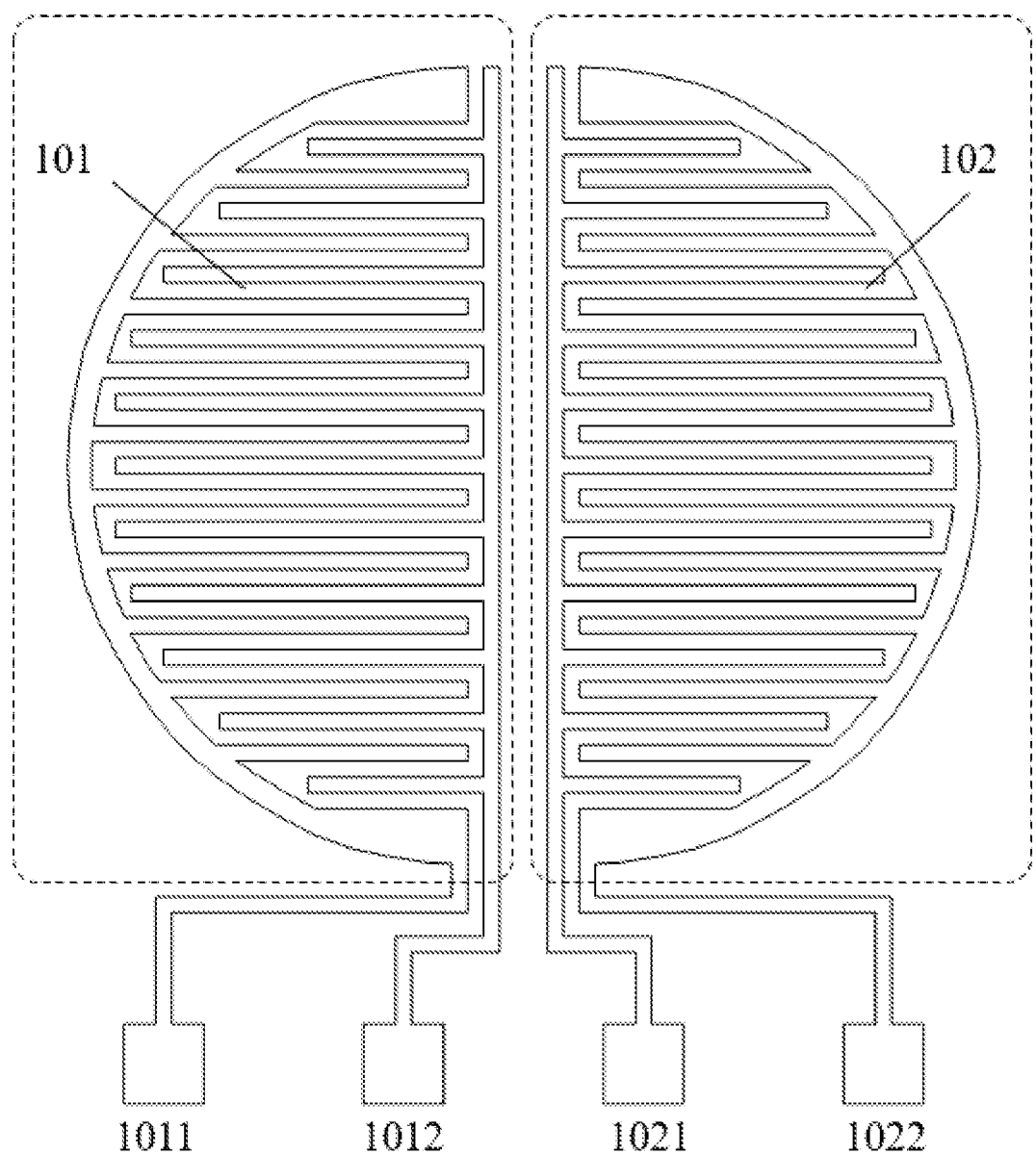
FIG. 1 is a schematic diagram of an interdigital capacitor of a humidity sensor according to and embodiment of the present disclosure.
Figure 2:
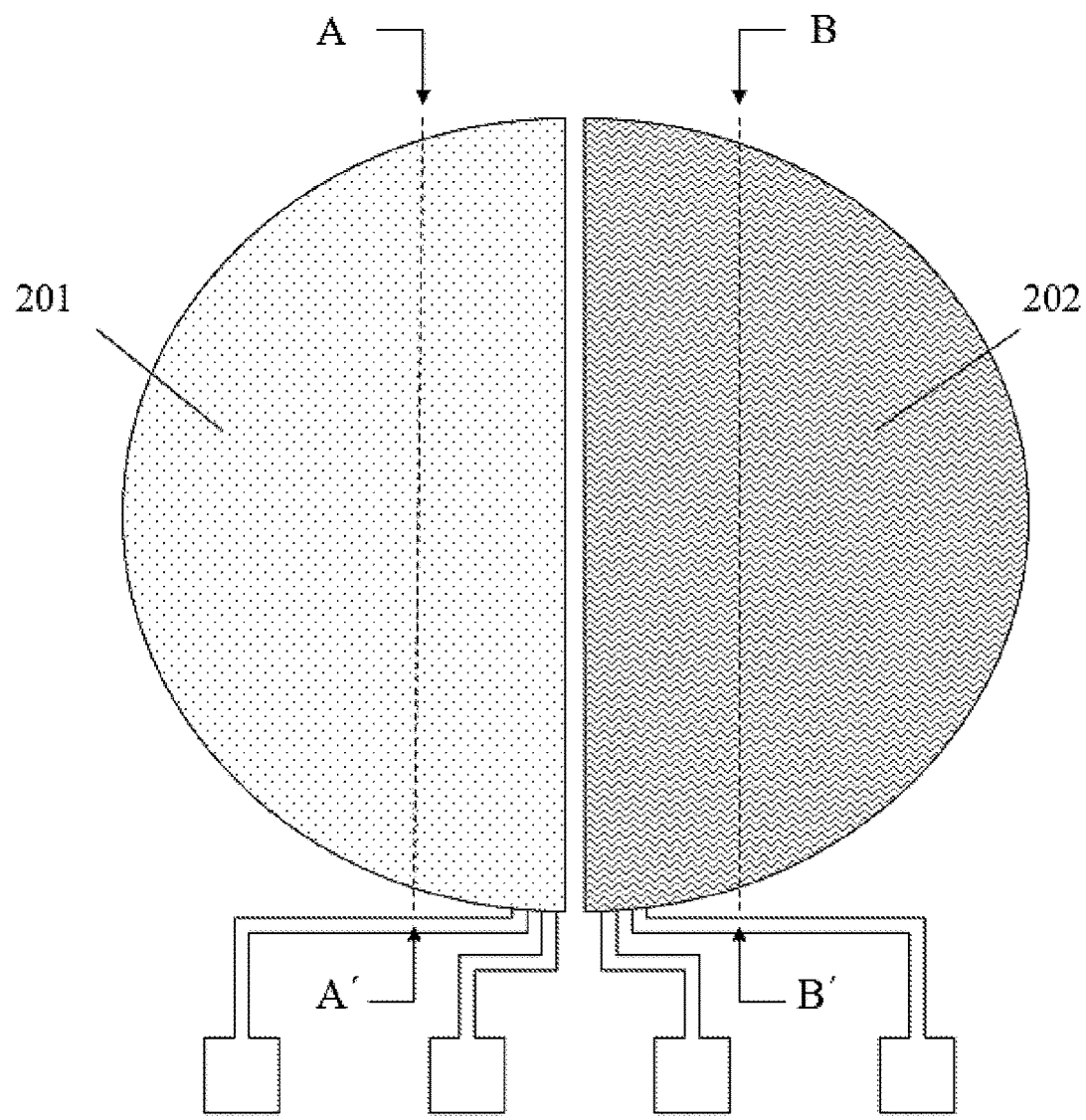
FIG. 2 is a sectional view of a humidity sensitive material of the humidity sensor according to an embodiment of the present disclosure.

One or more embodiments of the present disclosure provide a drift-free humidity sensor. Referring to FIGS. 1 and 2, the drift-free humidity sensor includes a first humidity sensor unit, a second humidity sensor unit, and an analysis and processing unit, wherein the analysis and processing unit is a processor or is part of a processor. The first humidity sensor unit includes first measuring electrode 101 and first humidity sensitive material 201 covering the first measuring electrode 101. The second humidity sensor unit includes second measuring electrode 102 and second humidity sensitive material 202 covering the second measuring electrode 102. The first humidity sensor unit and the second humidity sensor unit have different maximum humidity drifts. The analysis and processing unit is configured to calibrate and output measurement values of the first humidity sensor unit and the second humidity sensor unit.

Figure 3:
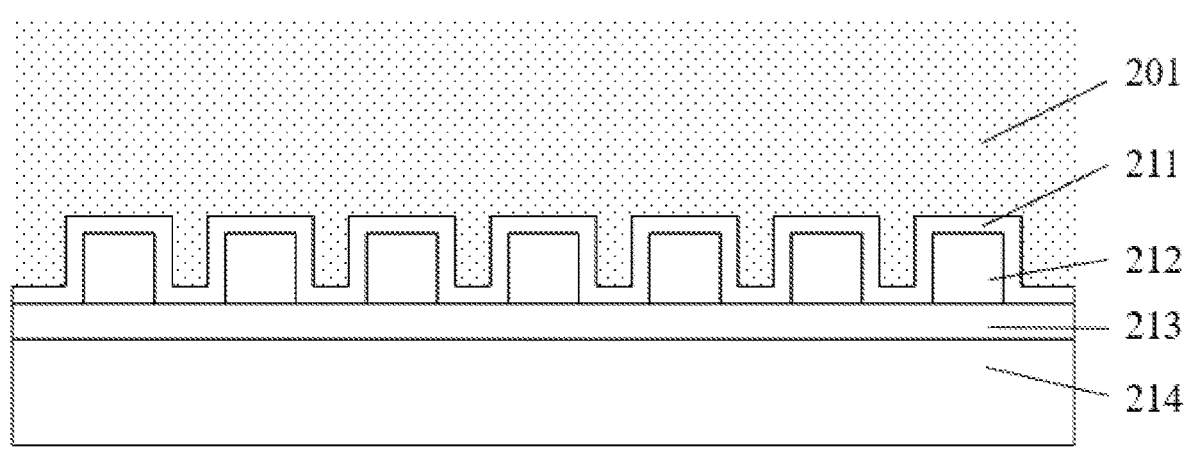
FIG. 3 is a sectional view of a first humidity sensor unit of a capacitive humidity sensor according to an embodiment of the present disclosure.

Referring to FIG. 3, the first measuring electrode 101 includes first measuring positive electrode 1011 and first measuring negative electrode 1012. The first measuring positive electrode 1011 and the first measuring negative electrode 1012 are provided with interdigital electrodes 212.

Figure 4:
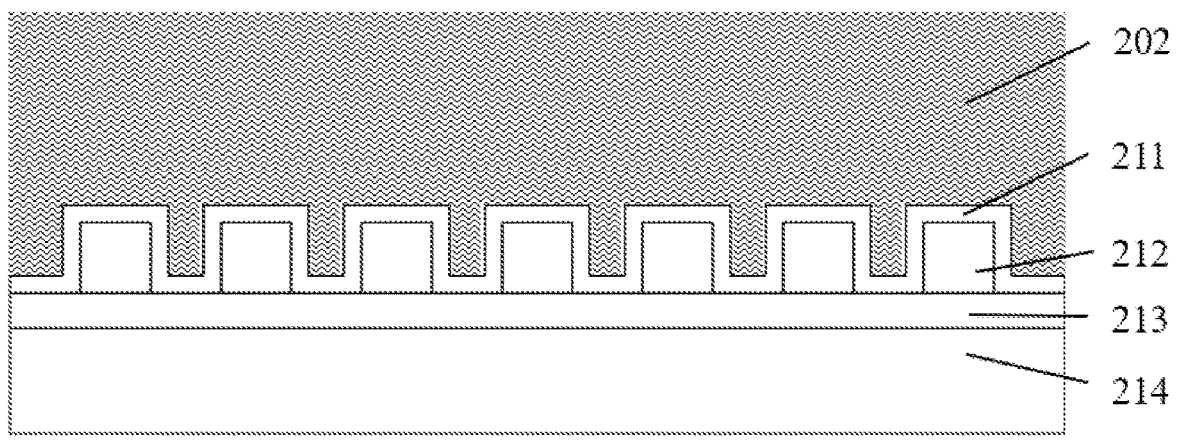
FIG. 4 is a sectional view of a second humidity sensor unit of the capacitive humidity sensor according to an embodiment of the present disclosure.

Referring to FIG. 4, the second measuring electrode 102 includes second measuring positive electrode 1021 and second measuring negative electrode 1022. The second measuring positive electrode 1021 and the second measuring negative electrode 1022 are provided with the interdigital electrodes 212. The interdigital electrodes 212 are arranged in a staggered manner.

The first measuring electrode 101 and the second measuring electrode 102 are capacitive electrodes. Alternatively, the first measuring electrode 101 and the second measuring electrode 102 are resistive electrodes.

The capacitive electrodes are described in detail below.

Passivation layer 211 is provided between one side of the first measuring electrode 101 and the first humidity sensitive material 201. Dielectric layer 213 and silicon wafer substrate 214 are sequentially arranged on the other side of the first measuring electrode 101. The dielectric layer 213 is filled between the first measuring electrode 101 and the silicon wafer substrate 214.

Passivation layer 211 is provided between one side of the second measuring electrode 102 and the second humidity sensitive material 202. Dielectric layer 213 and silicon wafer substrate 214 are sequentially arranged on the other side of the second measuring electrode 102. The dielectric layer 213 is filled between the second measuring electrode 102 and the silicon wafer substrate 214.

The first humidity sensitive material 201 and the second humidity sensitive material 202 are photosensitive humidity sensitive materials or non-photosensitive humidity sensitive materials. Processing methods of the first humidity sensitive material 201 and the second humidity sensitive material 202 vary according to the different materials.

If the first humidity sensitive material 201 and the second humidity sensitive material 202 are both the photosensitive humidity sensitive materials, patterning is performed through direct photolithography.

If one of the first humidity sensitive material 201 or the second humidity sensitive material 202 is the non-photosensitive humidity sensitive material, the processing method includes the following steps.

S1.1 The non-photosensitive humidity sensitive material is spin-coated and cured on the passivation layer 211 of the first measuring electrode 101 and the passivation layer 211 of the second measuring electrode 102. A photoresist is spin-coated on the non-photosensitive humidity sensitive material, and desired patterning is performed through photolithography. Dry etching is performed. The photoresist is removed to complete the processing of one humidity sensitive material.

S1.2. The photosensitive humidity sensitive material is spin-coated. Patterning is performed through photolithography. The photosensitive humidity sensitive material is cured to form the other humidity sensitive material.

If the first humidity sensitive material 201 and the second humidity sensitive material 202 are both the non-photosensitive humidity sensitive materials, the processing method includes the following steps.

S2.1 The first humidity sensitive material 201 is spin-coated and cured on the passivation layer 211 of the first measuring electrode and the passivation layer 211 of the second measuring electrode. A photoresist is spin-coated on the first humidity sensitive material, and desired patterning is performed through photolithography. Dry etching is performed. The photoresist is removed to complete the processing of the first humidity sensitive material 201.

S2.2. The second humidity sensitive material 202 is spin-coated and cured. A photoresist is spin-coated on the second humidity sensitive material, and desired patterning is performed through photolithography. Dry etching is performed. The second humidity sensitive material attached to the first humidity sensitive material is retained. The photoresist is removed to complete the processing of the second humidity sensitive material 202.

Figure 5:
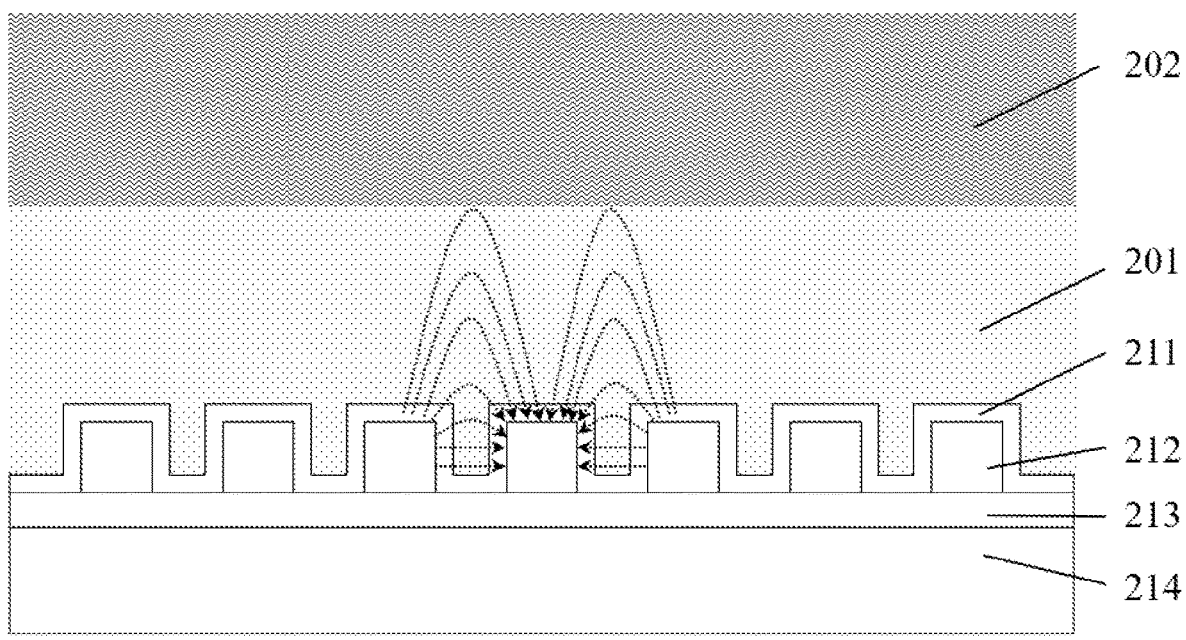
FIG. 5 is a sectional view of the first humidity sensor unit of in case two non-photosensitive humidity sensitive materials are used according to an embodiment of the present disclosure.

If the first humidity sensitive material 201 and the second humidity sensitive material 202 are both the non-photosensitive humidity sensitive materials, the problem will become complex. The processing method of the first humidity sensitive material 201 remains unchanged. However, if the same dry etching method is used to process the second humidity sensitive material 202, a problem arises. That is, as dry etching has no selectivity for the first humidity sensitive material 201 and the second humidity sensitive material 202, it will result in a thickness loss of the first humidity sensitive material 201 in a region of the first humidity sensor unit due to over-etching when the second humidity sensitive material 202 in a region outside the second humidity sensor unit is removed. However, fortunately, it is not necessary to remove the second humidity sensitive material 202 on the first humidity sensitive material 201. That is, referring to FIG. 5, the second humidity sensitive material 202 on the first sensor unit can be retained, which greatly reduces conflicts in process integration. However, this solution requires a prerequisite that the thickness of the first humidity sensitive material 201 is more than twice a sum of aluminum strip line width and edge spacing of the interdigital electrode 212. In this way, electric field lines of a capacitor will not or only a very small amount of the electric field lines will pass through the second humidity sensitive material 202. As shown in FIG. 5, the design reduces crosstalk between the first humidity sensitive material 201 and the second humidity sensitive material 202.

The resistive electrodes are described in detail below.

Figure 6:
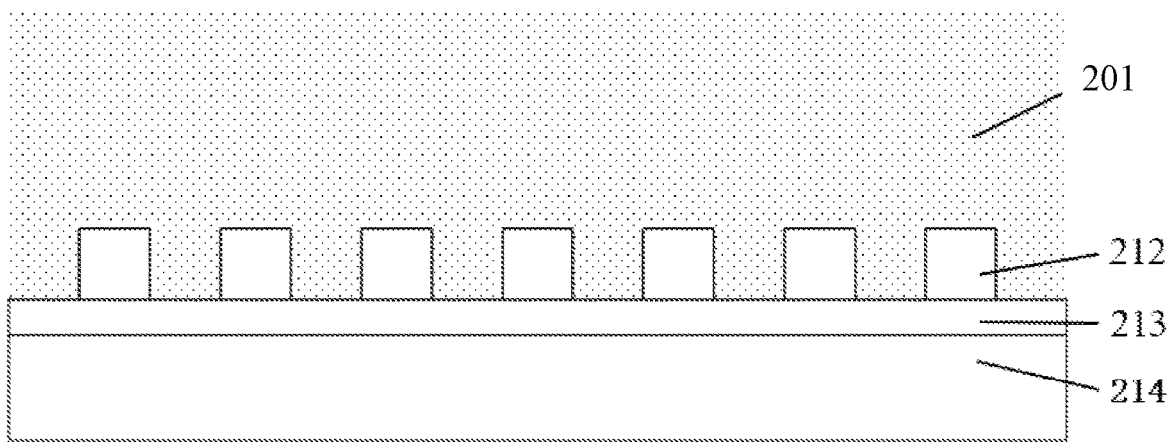
FIG. 6 is a sectional view of a resistive humidity sensor according to an embodiment of the present disclosure.

Referring to FIG. 6, the first humidity sensitive material 201 is arranged on one side of the first measuring electrode 101. Dielectric layer 213 and silicon wafer substrate 214 are sequentially arranged on the other side of the first measuring electrode 101. The dielectric layer 213 is filled between the first measuring electrode 101 and the silicon wafer substrate 214.

The second humidity sensitive material 202 is arranged on one side of the second measuring electrode 102. Dielectric layer 213 and silicon wafer substrate 214 are sequentially arranged on the other side of the second measuring electrode 102. The dielectric layer 213 is filled between the second measuring electrode 102 and the silicon wafer substrate 214.

The first humidity sensitive material 201 and the second humidity sensitive material 202 are both photosensitive humidity sensitive materials. Alternatively, one of the first humidity sensitive material 201 and the second humidity sensitive material 202 is a non-photosensitive humidity sensitive material, and the other one of the first humidity sensitive material 201 and the second humidity sensitive material 202 is a photosensitive humidity sensitive material. The processing method of the first humidity sensitive material 201 and the second humidity sensitive material 202 includes the following steps.

If the first humidity sensitive material 201 and the second humidity sensitive material 202 are both the photosensitive humidity sensitive materials, patterning is performed through direct photolithography.

If one of the first humidity sensitive material 201 or the second humidity sensitive material 202 is the non-photosensitive humidity sensitive material, the processing method includes the following steps.

S3.1 The non-photosensitive humidity sensitive material is spin-coated and cured on the first measuring electrode 101 and the second measuring electrode 102. A photoresist is spin-coated on the non-photosensitive humidity sensitive material, and desired patterning is performed through photolithography. Dry etching is performed. The photoresist is removed to complete the processing of one humidity sensitive material.

S3.2. The photosensitive humidity sensitive material is spin-coated. Patterning is performed through photolithography. The photosensitive humidity sensitive material is cured to form the other humidity sensitive material.

If the first humidity sensitive material 201 and the second humidity sensitive material 202 are both the non-photosensitive humidity sensitive materials, the processing method includes the following steps.

S4.1 A first non-photosensitive humidity sensitive material is spin-coated and cured on the first measuring electrode 101 and the second measuring electrode 102. A photoresist is spin-coated on the first non-photosensitive humidity sensitive material, and desired patterning is performed through photolithography. Dry etching is performed. The photoresist is removed to complete the processing of one humidity sensitive material.

S4.2. A second non-photosensitive humidity sensitive material is spin-coated, and a photoresist is spin-coated. Patterning is performed through photolithography. Development is performed on the photoresist through an alkaline developer (tetramethylammonium hydroxide (TMAH)), and the second non-photosensitive humidity sensitive material is corroded. The photoresist is removed, and the second non-photosensitive humidity sensitive material is cured to form the other humidity sensitive material.

For the resistive electrodes, if the first humidity sensitive material and the second humidity sensitive material are stacked simultaneously on the interdigital electrode, a parallel relationship is formed between the first humidity sensitive layer and the second humidity sensitive layer. The measured humidity sensitive resistance is a combined result of the first humidity sensitive material and the second humidity sensitive material. This will have an impact on the result of the humidity measuring unit. Therefore, when the humidity sensitive material is processed on the resistive electrode, both the first humidity sensitive material and the second humidity sensitive material cannot be non-photosensitive humidity sensitive materials. However, for the capacitive electrodes, the stacking of the first humidity sensitive material and the second humidity sensitive material is allowed due to the limited crossing height of the electric field lines. At this point, the thickness of the first humidity sensitive material 201 should be more than twice the sum of the aluminum strip line width and edge spacing of the interdigital electrode 212.

Figure 7:
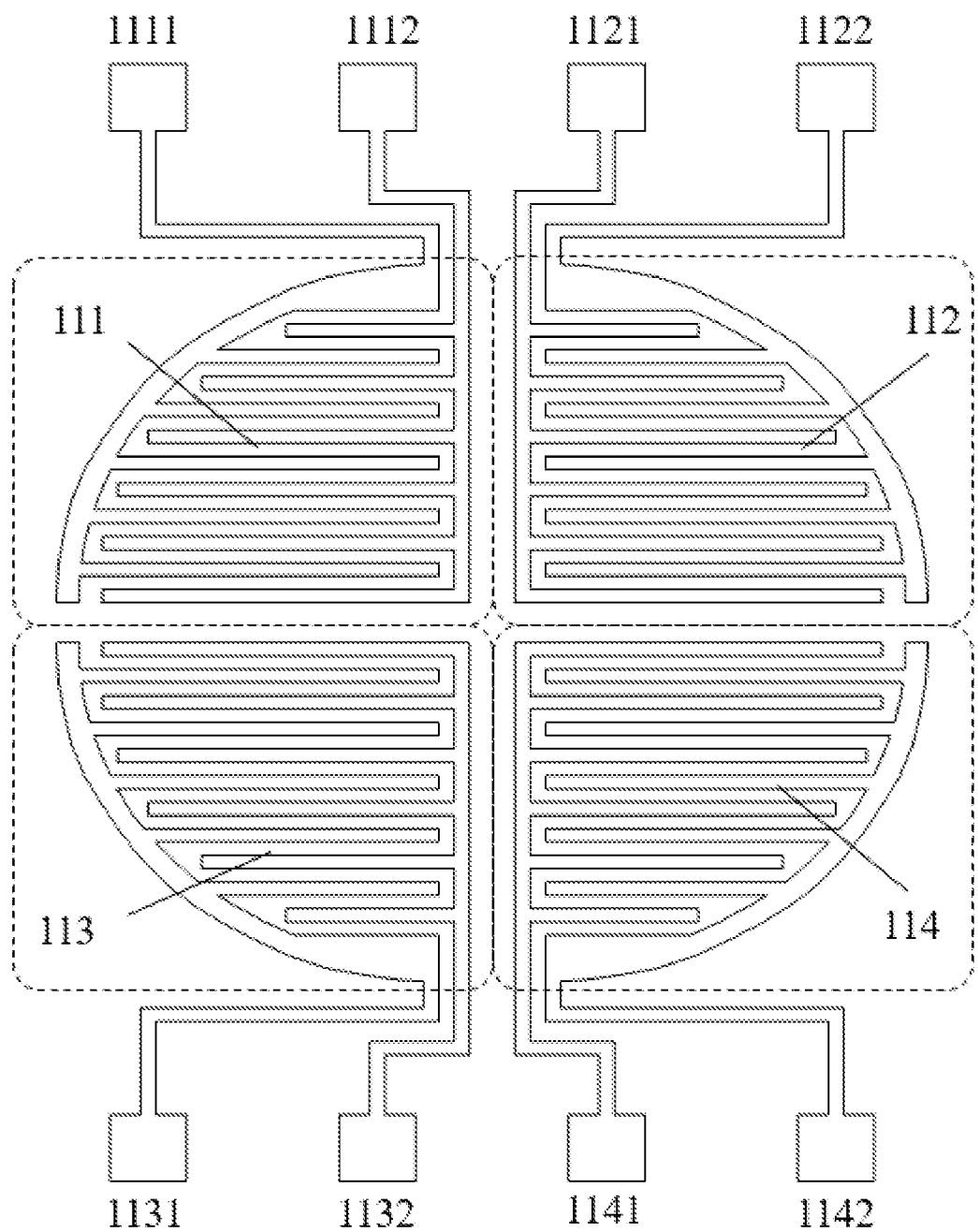
FIG. 7 is a schematic diagram of an interdigital capacitor of a humidity sensor with a differential sampling structure according to and embodiment of the present disclosure.

The above described is a solution for a single-ended structure humidity sensor. If an ASIC adopts a differential sampling structure, the first humidity sensor unit and the second humidity sensor unit at a sensor device end need to be designed as a differential pair. Referring to FIG. 7, it includes first sensor subunit 111, second sensor subunit 112, third sensor subunit 113, and fourth sensor subunit 114. The first sensor subunit 111 includes first subunit positive electrode 1111 and first subunit negative electrode 1112. The second sensor subunit 112 includes second subunit positive electrode 1121 and second subunit negative electrode 1122. The third sensor subunit 113 includes third subunit positive electrode 1131 and third subunit negative electrode 1132. The fourth sensor subunit 114 includes fourth subunit positive electrode 1141 and fourth subunit negative electrode 1142. According to one or more embodiments of the present disclosure, the required first humidity sensor unit and second humidity sensor unit may be a combination of any two of the sensor subunits. However, due to the high matching required for the actual layout, generally speaking, the first humidity sensor unit is a combination of the first sensor subunit 111 and the fourth sensor subunit 114, while the second humidity sensor unit is a combination of the second sensor subunit 112 and the third sensor subunit 113. The solution for subsequent coating of the humidity sensitive material is the same as the previous solution.

Figure 8:
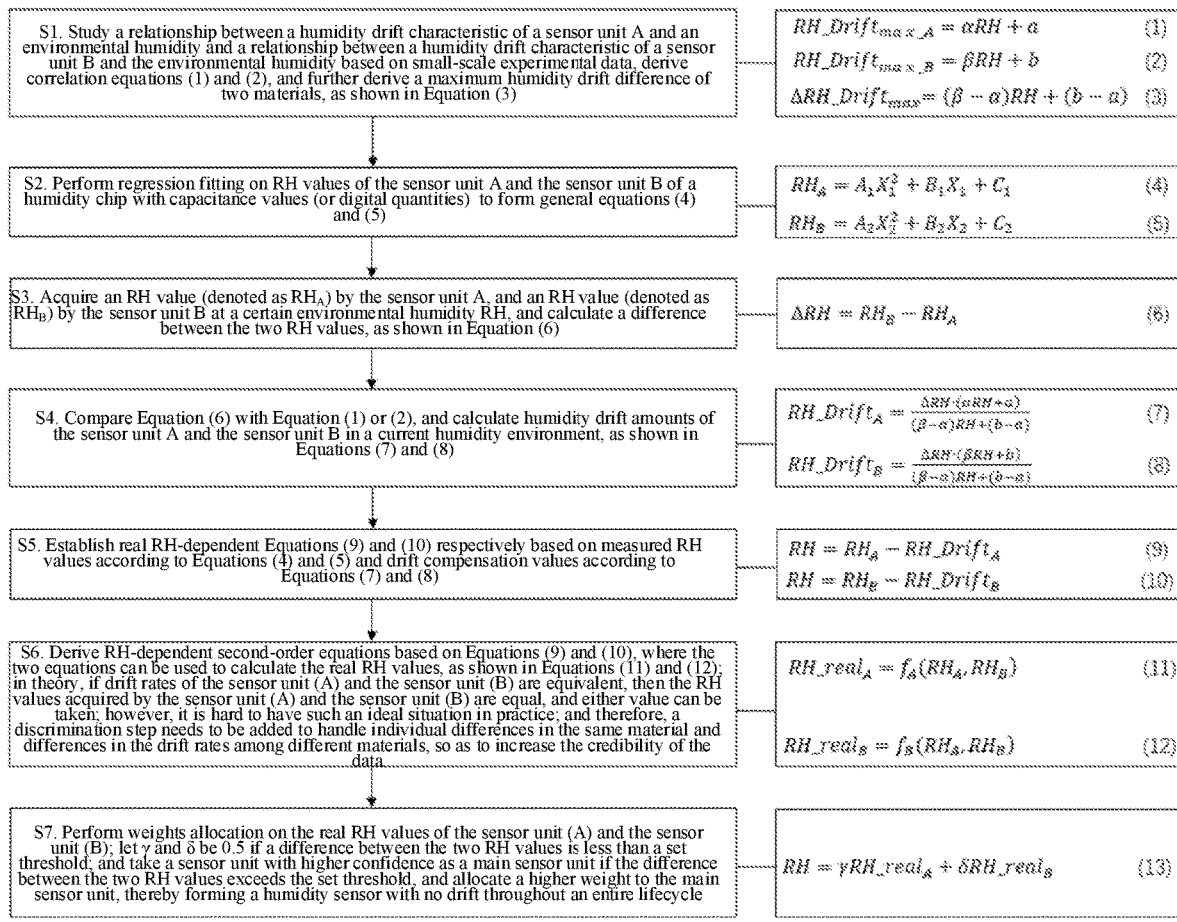
FIG. 8 is a flowchart of a calibration method of the humidity sensor according to an embodiment of the present disclosure.

An embodiment of the present disclosure proposes a calibration method of the drift-free humidity sensor. When the analysis and processing unit receives measurement results of the first humidity sensor unit and the second humidity sensor unit, it calculates an error between the measurement results and finally generates an accurate humidity value. Referring to FIG. 8, a specific calibration process includes the following steps.

S1. A relationship between a maximum humidity drift characteristic of the first humidity sensor unit and an environmental humidity and a relationship between a maximum humidity drift characteristic of the second humidity sensor unit and the environmental humidity are acquired, and a maximum drift difference between the first humidity sensor unit and the second humidity sensor unit is calculated.

Firstly, based on small-scale experimental data, the relationship between the maximum humidity drift characteristic of the first humidity sensor unit and the environmental humidity and the relationship between the maximum humidity drift characteristic of the second humidity sensor unit and the environmental humidity are studied. Universal regression relationships are expressed by environmental humidity-dependent first-order equations, such as Equations 1 and 2. Accelerated aging is carried out for a certain period of time through an 85° C./85% relative humidity (RH) test or a highly accelerated stress test (HAST) to stabilize the maximum drift of the sensor. Usually, during testing, the humidity drift is small at a low humidity, moderate at a medium humidity, and maximum at a high humidity, showing a correlation with currently tested environmental humidity. Some polymer materials also exhibit good linear drift in a full humidity range, with a first-order term of 0. A maximum drift difference of the first humidity sensor unit and the second humidity sensor unit is calculated to acquire Equation 3 as a subsequent reference.

$$RH\_Drift_{max\_A} = \alpha RH + a \tag{1}$$

$$RH\_Drift_{max\_B} = \beta RH + b \tag{2}$$

$$\Delta RH\_Drift_{max} = (\beta - \alpha)RH + (b - a) \tag{3}$$

S2. Capacitance values of the first humidity sensor unit and the second humidity sensor unit are regressed and fitted with measured RH values to acquire a first fitted equation and a second fitted equation.

The first humidity sensor unit and the second humidity sensor unit are calibrated, and a corresponding relationship of environmental humidity-humidity capacitance or resistance-analog-to-digital (ADC) digital quantity-humidity reading is established. Generally speaking, second-order fitting meets the accuracy requirements of most sensors, as shown in Equations 4 and 5. Of course, based on the design capabilities of digital circuits or the needs of sensing devices, methods such as third or higher-order regression fitting can be used. After this step is completed, the first humidity sensor unit and the second humidity sensor unit can independently measure respective humidity values.

$$RH_A = A_1X_1^2 + B_1X_1 + C_1 \quad (4)$$

$$RH_B = A_2X_2^2 + B_2X_2 + C_2 \quad (5)$$

S3. The RH values of the first humidity sensor unit and the second humidity sensor unit in a certain humidity environment are acquired, an actual RH difference between the first humidity sensor unit and the second humidity sensor unit is calculated, and the actual RH difference is compared with the maximum drift difference.

At a certain environmental humidity RH, two humidity values, namely $RH_A$ and $RH_B$, are read by the first humidity sensor unit and the second humidity sensor unit, respectively. A difference between the two humidity values is calculated, as shown in Equation 6:

$$\Delta RH = RH_B - RH_A \quad (6)$$

S4. The actual RH difference between the first humidity sensor unit and the second humidity sensor unit is compared with the relationship between the maximum drift characteristic of the first humidity sensor unit and the environmental humidity and the relationship between the maximum drift characteristic of the second humidity sensor unit and the environmental humidity to acquire a humidity drift amount of the first humidity sensor unit and a humidity drift amount of the second humidity sensor unit in a current humidity environment.

Equation 6 is compared with Equation 1 or 2 to acquire a humidity drift amount of sensor unit A and a humidity drift amount of sensor unit B in the current humidity environment, as shown in Equations 7 and 8, respectively.

$$RH\_Drift_A = \frac{\Delta RH \cdot (\alpha RH + a)}{(\beta - \alpha)RH + (b - a)} \quad (7)$$

$$RH\_Drift_B = \frac{\Delta RH \cdot (\beta RH + b)}{(\beta - \alpha)RH + (b - a)} \quad (8)$$

S5. Based on the first fitted equation and the second fitted equation, as well as the humidity drift amount of the first humidity sensor unit and the humidity drift amount of the second humidity sensor unit acquired in step S4, real RH-dependent equations are established, respectively.

Based on the measured RH values according to Equations 4 and 5 and drift compensation values according to Equations 7 and 8, real RH-dependent equations are established, as shown in Equations 9 and 10.

$$RH = RH_A - RH\_Drift_A \quad (9)$$

$$RH = RH_B - RH\_Drift_B \quad (10)$$

S6. Based on the real RH-dependent equations in step S5, an RH-dependent second-order equation of the first humidity sensor unit and an RH-dependent second-order equation of the second humidity sensor unit are established.

According to Equations 9 and 10, the RH-dependent second-order equations are acquired. The two equations can be used to calculate the real RH values, as shown in Equations 11 and 12. In theory, if drift rates of the sensor unit A and the sensor unit B are equivalent, then the RH values acquired by the sensor unit A and the sensor unit B are equal, and either value can be taken. However, it is hard to have such an ideal situation in practice. A discrimination step needs to be added to handle individual differences in the same material and differences in the drift rates among different materials, so as to increase the credibility of the data.

$$RH\_real_A = f_A(RH_A, RH_B) \quad (11)$$

$$RH\_real_B = f_B(RH_A, RH_B) \quad (12)$$

S7. Weighting is performed based on a difference between an RH value calculated according to the RH-dependent second-order equation of the first humidity sensor unit and an RH value calculated according to the RH-dependent second-order equation of the second humidity sensor unit to complete the calibration process.

Finally, weights allocation is performed on the real RH values of the sensor unit A and the sensor unit B. When the difference between the two RH values is less than a set threshold, $\gamma$ and $\delta$ can be taken as 0.5. When the difference between the two RH values exceeds the set threshold, the sensor unit with higher confidence is taken as a main sensor unit, and a higher weight is allocated to the main sensor unit. This allows for a humidity sensor with no drift throughout its entire lifecycle.

$$RH = \gamma RH\_real_A + \delta RH\_real_B \quad (13)$$

In the description of the present application, it needs to be understood the orientation or positional relationships indicated by terms, such as "up", "down", "front", "rear", "left", "right", "vertical", "horizontal", "top", "bottom", "inside", and "outside", are based on the orientation or positional relationship shown in the drawings, are merely for facilitating the description of the present application and simplifying the description, rather than indicating or implying that an apparatus or element referred to must have a particular orientation or be constructed and operated in a particular orientation, and therefore will not be interpreted as limiting the present application.

Compared with the prior art, the present disclosure has the following beneficial effects:

1. The humidity sensor of the present disclosure can effectively solve the drift problem of ordinary capacitive or resistive humidity sensors.

2. The present disclosure adopts corresponding processing methods adapted to different humidity sensitive materials, and has high applicability.

3. The calibration method of the present disclosure compensates and corrects the measurement values of the first humidity sensor unit and the second humidity sensor unit, achieving drift-free humidity measurement and low implementation cost.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments in the present disclosure and features in the embodiments may be freely combined with each other in a non-conflicting manner.

What is claimed is:

1. A drift-free humidity sensor, comprising a first humidity sensor unit, a second humidity sensor unit, and an analysis and processing unit, wherein the analysis and processing unit is a processor or is part of a processor; the first humidity sensor unit comprises a first measuring electrode and a first humidity sensitive material covering the first measuring electrode; the second humidity sensor unit comprises a second measuring electrode and a second humidity sensitive material covering the second measuring electrode; the first humidity sensor unit and the second humidity sensor unit have different maximum humidity drifts; and the analysis and processing unit is configured to calibrate and output measurement values of the first humidity sensor unit and the second humidity sensor unit.

2. The drift-free humidity sensor according to claim 1, wherein the first measuring electrode comprises a first measuring positive electrode and a first measuring negative electrode; and the first measuring positive electrode and the first measuring negative electrode are provided with interdigital electrodes;

the second measuring electrode comprises a second measuring positive electrode and a second measuring negative electrode; and the second measuring positive electrode and the second measuring negative electrode are provided with the interdigital electrodes; and the interdigital electrodes are arranged in a staggered manner.

3. The drift-free humidity sensor according to claim 1, wherein the first measuring electrode and the second measuring electrode are capacitive electrodes.

4. The drift-free humidity sensor according to claim 3, wherein when the first measuring electrode and the second measuring electrode are the capacitive electrodes, a passivation layer is provided between one side of the first measuring electrode and the first humidity sensitive material; a dielectric layer and a silicon wafer substrate are sequentially arranged on the other side of the first measuring electrode; and the dielectric layer is filled between the first measuring electrode and the silicon wafer substrate; and the passivation layer is provided between one side of the second measuring electrode and the second humidity sensitive material; the dielectric layer and the silicon wafer substrate are sequentially arranged on the other side of the second measuring electrode; and the dielectric layer is filled between the second measuring electrode and the silicon wafer substrate.

5. The drift-free humidity sensor according to claim 3, wherein when the first measuring electrode and the second measuring electrode are the resistive electrodes, the first humidity sensitive material is arranged on one side of the first measuring electrode; a dielectric layer and a silicon wafer substrate are sequentially arranged on the other side of the first measuring electrode; and the dielectric layer is filled between the first measuring electrode and the silicon wafer substrate; and the second humidity sensitive material is arranged on one side of the second measuring electrode; the dielectric layer and the silicon wafer substrate are sequentially arranged on the other side of the second measuring electrode; and the dielectric layer is filled between the second measuring electrode and the silicon wafer substrate.

6. The drift-free humidity sensor according to claim 4, wherein the first humidity sensitive material and the second humidity sensitive material are photosensitive humidity sensitive materials or non-photosensitive humidity sensitive materials; and a processing method of the first humidity sensitive material and the second humidity sensitive material comprises:

when the first humidity sensitive material and the second humidity sensitive material are both the photosensitive humidity sensitive materials, performing patterning through direct photolithography;

when the first humidity sensitive material or the second humidity sensitive material is the non-photosensitive humidity sensitive material, the processing method comprises:

S1.1: spin-coating and curing the non-photosensitive humidity sensitive material on the passivation layer of the first measuring electrode and the passivation layer of the second measuring electrode; spin-coating a photoresist on the non-photosensitive humidity sensitive material, and performing desired patterning through photolithography; performing dry etching; and removing the photoresist to complete a processing of one humidity sensitive material; and S1.2: spin-coating the photosensitive humidity sensitive material; performing patterning through photolithography; and curing the photosensitive humidity sensitive material to form the other humidity sensitive material; and when the first humidity sensitive material and the second humidity sensitive material are both the non-photosensitive humidity sensitive materials, the processing method comprises:

S2.1: spin-coating and curing the first humidity sensitive material on the passivation layer of the first measuring electrode and the passivation layer of the second measuring electrode, wherein a thickness of the first humidity sensitive material is more than twice a sum of a width and edge spacing of the interdigital electrode; spin-coating a photoresist on the first humidity sensitive material, and performing desired patterning through photolithography; performing dry etching; and removing the photoresist to complete the processing of the first humidity sensitive material; and S2.2: spin-coating and curing the second humidity sensitive material; spin-coating a photoresist on the second humidity sensitive material, and performing desired patterning through photolithography; performing dry etching; retaining the second humidity sensitive material attached to the first humidity sensitive material; and removing the photoresist to complete the processing of the second humidity sensitive material.

7. The drift-free humidity sensor according to claim 5, wherein the first humidity sensitive material and the second humidity sensitive material are both photosensitive humidity sensitive materials; alternatively, one of the first humidity sensitive material and the second humidity sensitive material is a non-photosensitive humidity sensitive material, and the other one of the first humidity sensitive material and the second humidity sensitive material is a photosensitive humidity sensitive material; and a processing method of the first humidity sensitive material and the second humidity sensitive material comprises:

when the first humidity sensitive material and the second humidity sensitive material are both the photosensitive humidity sensitive materials, performing patterning through direct photolithography;

when the first humidity sensitive material or the second humidity sensitive material is the non-photosensitive humidity sensitive material, the processing method comprises:

S3.1: spin-coating and curing the non-photosensitive humidity sensitive material on the first measuring electrode and the second measuring electrode; spin-coating a photoresist on the non-photosensitive humidity sensitive material, and performing desired patterning through photolithography; performing dry etching; and removing the photoresist to complete a processing of one humidity sensitive material; and S3.2: spin-coating the photosensitive humidity sensitive material; performing patterning through photolithography; and curing the photosensitive humidity sensitive material to form the other humidity sensitive material; and when the first humidity sensitive material and the second humidity sensitive material are both the non-photosensitive humidity sensitive materials, the processing method comprises:

S4.1: spin-coating and curing a first non-photosensitive humidity sensitive material on the first measuring electrode and the second measuring electrode; spin-coating a photoresist on the first non-photosensitive humidity sensitive material, and performing desired patterning through photolithography; performing dry etching; and removing the photoresist to complete the processing of one humidity sensitive material; and S4.2: spin-coating a second non-photosensitive humidity sensitive material; spin-coating a photoresist, and performing patterning through photolithography; performing development on the photoresist through an alkaline developer (tetramethylammonium hydroxide (TMAH)), and corroding the second non-photosensitive humidity sensitive material; removing the photoresist; and curing the second non-photosensitive humidity sensitive material to form the other humidity sensitive material.

8. The drift-free humidity sensor according to claim 1, wherein the drift-free humidity sensor is provided with a differential sampling structure; and the first humidity sensor unit comprises a first sensor subunit and a second sensor subunit, while the second humidity sensor unit comprises a third sensor subunit and a fourth sensor subunit.

9. A calibration method of a humidity sensor, based on the drift-free humidity sensor according to claim 1, and comprising:

S1: acquiring a relationship between a maximum humidity drift characteristic of the first humidity sensor unit and an environmental humidity and a relationship between a maximum humidity drift characteristic of the second humidity sensor unit and the environmental humidity, and calculating a maximum drift difference between the first humidity sensor unit and the second humidity sensor unit;

S2: performing regression fitting on humidity sensitive capacitance or resistance values of the first humidity sensor unit and the second humidity sensor unit with measured relative humidity (RH) values to acquire a first fitted equation and a second fitted equation;

S3: acquiring RH values of the first humidity sensor unit and the second humidity sensor unit in a certain humidity environment, calculating an actual RH difference between the first humidity sensor unit and the second humidity sensor unit, and comparing the actual RH difference with the maximum drift difference;

S4: comparing the actual RH difference between the first humidity sensor unit and the second humidity sensor unit with the relationship between the maximum drift characteristic of the first humidity sensor unit and the environmental humidity and the relationship between the maximum drift characteristic of the second humidity sensor unit and the environmental humidity to acquire a humidity drift amount of the first humidity sensor unit and a humidity drift amount of the second humidity sensor unit in a current humidity environment;

S5: based on the first fitted equation and the second fitted equation, as well as the humidity drift amount of the first humidity sensor unit and the humidity drift amount of the second humidity sensor unit acquired in step S4, establishing real RH-dependent equations, respectively;

S6: establishing, based on the real RH-dependent equations in step S5, an RH-dependent second-order equation of the first humidity sensor unit and an RH-dependent second-order equation of the second humidity sensor unit; and S7: weighting based on a difference between an RH value calculated according to the RH-dependent second-order equation of the first humidity sensor unit and an RH value calculated according to the RH-dependent second-order equation of the second humidity sensor unit to complete a calibration process.

10. The calibration method of the humidity sensor according to claim 9, wherein a maximum drift of the first humidity sensor unit and a maximum drift of the second humidity sensor unit are acquired through an 85° C./85% RH test or a 120° C./100% RH highly accelerated stress test (HAST).

11. The calibration method of the humidity sensor according to claim 9, wherein step S7 further comprises: performing weights allocation according to a ratio of 1:1 when the difference between the RH value calculated according to the RH-dependent second-order equation of the first humidity sensor unit and the RH value calculated according to the RH-dependent second-order equation of the second humidity sensor unit is less than a set value; and taking, when the difference is greater than the set value, a sensor unit with higher confidence as a main sensor unit, and allocating a higher weight to the main sensor unit.

12. The calibration method of the humidity sensor according to claim 9, wherein in the drift-free humidity sensor, the first measuring electrode comprises a first measuring positive electrode and a first measuring negative electrode; and the first measuring positive electrode and the first measuring negative electrode are provided with the interdigital electrodes;

the second measuring electrode comprises a second measuring positive electrode and a second measuring negative electrode; and the second measuring positive electrode and the second measuring negative electrode are provided with the interdigital electrodes; and the interdigital electrodes are arranged in a staggered manner.

13. The calibration method of the humidity sensor according to claim 9, wherein in the drift-free humidity sensor, the first measuring electrode and the second measuring electrode are capacitive electrodes.

14. The calibration method of the humidity sensor according to claim 13, wherein in the drift-free humidity sensor, when the first measuring electrode and the second measuring electrode are the capacitive electrodes, a passivation layer is provided between one side of the first measuring electrode and the first humidity sensitive material; a dielectric layer and a silicon wafer substrate are sequentially arranged on the other side of the first measuring electrode; and the dielectric layer is filled between the first measuring electrode and the silicon wafer substrate; and the passivation layer is provided between one side of the second measuring electrode and the second humidity sensitive material; the dielectric layer and the silicon wafer substrate are sequentially arranged on the other side of the second measuring electrode; and the dielectric layer is filled between the second measuring electrode and the silicon wafer substrate.

15. The calibration method of the humidity sensor according to claim 13, wherein in the drift-free humidity sensor, when the first measuring electrode and the second measuring electrode are the resistive electrodes, the first humidity sensitive material is arranged on one side of the first measuring electrode; a dielectric layer and a silicon wafer substrate are sequentially arranged on the other side of the first measuring electrode; and the dielectric layer is filled between the first measuring electrode and the silicon wafer substrate; and the second humidity sensitive material is arranged on one side of the second measuring electrode; the dielectric layer and the silicon wafer substrate are sequentially arranged on the other side of the second measuring electrode; and the dielectric layer is filled between the second measuring electrode and the silicon wafer substrate.

16. The calibration method of the humidity sensor according to claim 14, wherein in the drift-free humidity sensor, the first humidity sensitive material and the second humidity sensitive material are photosensitive humidity sensitive materials or non-photosensitive humidity sensitive materials; and a processing method of the first humidity sensitive material and the second humidity sensitive material comprises:

when the first humidity sensitive material and the second humidity sensitive material are both the photosensitive humidity sensitive materials, performing patterning through direct photolithography;

when the first humidity sensitive material or the second humidity sensitive material is the non-photosensitive humidity sensitive material, the processing method comprises:

S1.1: spin-coating and curing the non-photosensitive humidity sensitive material on the passivation layer of the first measuring electrode and the passivation layer of the second measuring electrode; spin-coating a photoresist on the non-photosensitive humidity sensitive material, and performing desired patterning through photolithography; performing dry etching; and removing the photoresist to complete a processing of one humidity sensitive material; and S1.2: spin-coating the photosensitive humidity sensitive material; performing patterning through photolithography; and curing the photosensitive humidity sensitive material to form the other humidity sensitive material; and when the first humidity sensitive material and the second humidity sensitive material are both the non-photosensitive humidity sensitive materials, the processing method comprises:

S2.1: spin-coating and curing the first humidity sensitive material on the passivation layer of the first measuring electrode and the passivation layer of the second measuring electrode, wherein a thickness of the first humidity sensitive material is more than twice a sum of a width and edge spacing of the interdigital electrodes; spin-coating a photoresist on the first humidity sensitive material, and performing desired patterning through photolithography; performing dry etching; and removing the photoresist to complete the processing of the first humidity sensitive material; and S2.2: spin-coating and curing the second humidity sensitive material; spin-coating a photoresist on the second humidity sensitive material, and performing desired patterning through photolithography; performing dry etching; retaining the second humidity sensitive material attached to the first humidity sensitive material; and removing the photoresist to complete the processing of the second humidity sensitive material.

17. The calibration method of the humidity sensor according to claim 15, wherein in the drift-free humidity sensor, the first humidity sensitive material and the second humidity sensitive material are both photosensitive humidity sensitive materials; alternatively, one of the first humidity sensitive material and the second humidity sensitive material is a non-photosensitive humidity sensitive material, and the other one of the first humidity sensitive material and the second humidity sensitive material is a photosensitive humidity sensitive material; and a processing method of the first humidity sensitive material and the second humidity sensitive material comprises:

when the first humidity sensitive material and the second humidity sensitive material are both the photosensitive humidity sensitive materials, performing patterning through direct photolithography;

when the first humidity sensitive material or the second humidity sensitive material is the non-photosensitive humidity sensitive material, the processing method comprises:

S3.1: spin-coating and curing the non-photosensitive humidity sensitive material on the first measuring electrode and the second measuring electrode; spin-coating a photoresist on the non-photosensitive humidity sensitive material, and performing desired patterning through photolithography; performing dry etching; and removing the photoresist to complete a processing of one humidity sensitive material; and S3.2: spin-coating the photosensitive humidity sensitive material; performing patterning through photolithography; and curing the photosensitive humidity sensitive material to form the other humidity sensitive material; and when the first humidity sensitive material and the second humidity sensitive material are both the non-photosensitive humidity sensitive materials, the processing method comprises:

S4.1: spin-coating and curing a first non-photosensitive humidity sensitive material on the first measuring electrode and the second measuring electrode; spin-coating a photoresist on the first non-photosensitive humidity sensitive material, and performing desired patterning through photolithography; performing dry etching; and removing the photoresist to complete the processing of one humidity sensitive material; and S4.2: spin-coating a second non-photosensitive humidity sensitive material; spin-coating a photoresist, and performing patterning through photolithography; performing development on the photoresist through an alkaline developer (tetramethylammonium hydroxide (TMAH)), and corroding the second non-photosensitive humidity sensitive material; removing the photoresist; and curing the second non-photosensitive humidity sensitive material to form the other humidity sensitive material.

18. The drift-free humidity sensor according to claim 9, wherein in the drift-free humidity sensor, the drift-free humidity sensor is provided with a differential sampling structure; and the first humidity sensor unit comprises a first sensor subunit and a second sensor subunit, while the second humidity sensor unit comprises a third sensor subunit and a fourth sensor subunit.

19. The drift-free humidity sensor according to claim 1, wherein the first measuring electrode and the second measuring electrode are resistive electrodes.

20. The calibration method of the humidity sensor according to claim 9, wherein in the drift-free humidity sensor, the first measuring electrode and the second measuring electrode are resistive electrodes.

* * * * *